United States Patent
Kishi et al.

(10) Patent No.: US 7,503,649 B2
(45) Date of Patent: Mar. 17, 2009

(54) ACTIVE ENERGY RAY CURABLE AQUEOUS INK COMPOSITION, AND INKJET RECORDING METHOD, INK CARTRIDGE, RECORDING UNIT, AND INKJET RECORDING APPARATUS USING THE SAME

(75) Inventors: Hiromitsu Kishi, Yokohama (JP); Tsuyoshi Kanke, Kawasaki (JP); Yutaka Kurabayashi, Tokyo (JP); Hiromichi Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 327 days.

(21) Appl. No.: 11/223,948

(22) Filed: Sep. 13, 2005

(65) Prior Publication Data
US 2006/0004116 A1    Jan. 5, 2006

Related U.S. Application Data

(63) Continuation of application No. PCT/JP2005/006435, filed on Mar. 25, 2005.

(30) Foreign Application Priority Data

Mar. 26, 2004   (JP)   .............................. 2004-092371

(51) Int. Cl.
    *C09D 11/00* (2006.01)
(52) U.S. Cl. ..................................... 347/100; 106/31.13
(58) Field of Classification Search ................. 347/100; 106/31.13
    See application file for complete search history.

(56) References Cited

U.S. PATENT DOCUMENTS

| | | | |
|---|---|---|---|
| 4,313,124 A | 1/1982 | Hara | 346/140 R |
| 4,345,262 A | 8/1982 | Shirato et al. | 346/140 R |
| 4,459,600 A | 7/1984 | Sato et al. | 346/140 R |
| 4,463,359 A | 7/1984 | Ayata et al. | 346/1.1 |
| 4,558,333 A | 12/1985 | Sugitani et al. | 346/140 R |
| 4,719,297 A * | 1/1988 | Henne et al. | 544/107 |
| 4,723,129 A | 2/1988 | Endo et al. | 346/1.1 |
| 4,740,796 A | 4/1988 | Endo et al. | 346/1.1 |
| 5,043,747 A | 8/1991 | Ebisawa et al. | 346/140 R |
| 5,081,470 A | 1/1992 | Kurabayashi et al. | 346/1.1 |
| 5,124,201 A | 6/1992 | Kurabayashi et al. | 428/323 |
| 5,137,778 A | 8/1992 | Nakatsugawa et al. | 428/330 |

(Continued)

FOREIGN PATENT DOCUMENTS

JP   57-197289   12/1982

(Continued)

*Primary Examiner*—Manish S Shah
*Assistant Examiner*—Laura E Martin
(74) *Attorney, Agent, or Firm*—Fitzpatrick, Cella, Harper & Scinto

(57) ABSTRACT

To provide an active energy ray curable aqueous ink composition exhibiting excellent curing performance by including a water-soluble polymerizable substance with high reactivity and a water-soluble polymerization initiator having high initiation efficiency; and an inkjet recording method, ink cartridge, recording unit, and inkjet recording apparatus all using the active energy ray curable aqueous ink composition. The active energy ray curable aqueous ink composition includes at least water; a polymerizable substance which undergoes radical polymerization by active energy rays; and a polymerization initiator which generates radicals by active energy rays, in which the polymerizable substance is a water-soluble compound having 2 to 6 (meth)acrylic groups; and the polymerization initiator is a water-soluble acylphosphine oxide compound.

1 Claim, 1 Drawing Sheet

U.S. PATENT DOCUMENTS

| | | | |
|---|---|---|---|
| 5,150,132 A | 9/1992 | Shimomura et al. | 346/140 R |
| 5,160,370 A | 11/1992 | Suga et al. | 106/20 |
| 5,171,626 A | 12/1992 | Nagamine et al. | 428/212 |
| 5,172,133 A | 12/1992 | Suga et al. | 346/1.1 |
| 5,229,786 A | 7/1993 | Suga et al. | 346/1.1 |
| 5,246,774 A | 9/1993 | Sakaki et al. | 428/323 |
| 5,277,962 A | 1/1994 | Nakatsugawa et al. | 428/32.35 |
| 5,354,369 A | 10/1994 | Shimomura et al. | 106/22 H |
| 5,362,558 A | 11/1994 | Sakaki et al. | 428/323 |
| 5,409,529 A | 4/1995 | Nagashima et al. | 106/22 H |
| 5,415,686 A | 5/1995 | Kurabayashi et al. | 106/26 R |
| 5,439,515 A | 8/1995 | Kurabayashi et al. | 106/20 R |
| 5,526,031 A | 6/1996 | Kurabayashi | 347/100 |
| 5,549,740 A | 8/1996 | Takahashi et al. | 106/20 R |
| 5,606,356 A | 2/1997 | Noguchi et al. | 347/100 |
| 5,614,007 A | 3/1997 | Kurabayashi et al. | 106/22 R |
| 5,618,338 A | 4/1997 | Kurabayashi et al. | 106/26 R |
| 5,623,294 A | 4/1997 | Takizawa et al. | 347/98 |
| 5,624,484 A | 4/1997 | Takahashi et al. | 106/31.75 |
| 5,651,814 A | 7/1997 | Shimomura et al. | 106/31.36 |
| 5,658,376 A | 8/1997 | Noguchi et al. | 106/31.43 |
| 5,686,508 A | 11/1997 | Shimomura et al. | 523/161 |
| 5,696,182 A | 12/1997 | Kashiwazaki et al. | 523/161 |
| 5,700,314 A | 12/1997 | Kurbayashi et al. | 106/31.27 |
| 5,733,363 A | 3/1998 | Nagashima et al. | 106/31.43 |
| 5,734,403 A | 3/1998 | Suga et al. | 347/101 |
| 5,792,249 A | 8/1998 | Shirota et al. | 106/31.6 |
| 5,835,116 A | 11/1998 | Sato et al. | 347/98 |
| 5,849,815 A | 12/1998 | Aoki et al. | 523/161 |
| 5,861,194 A | 1/1999 | Noguchi et al. | 427/386 |
| 5,866,638 A | 2/1999 | Shimomura et al. | 523/16 |
| 5,952,401 A | 9/1999 | Kimura | 523/161 |
| 5,952,414 A | 9/1999 | Noguchi et al. | 524/377 |
| 5,954,906 A | 9/1999 | Abe et al. | 156/247 |
| 5,985,975 A | 11/1999 | Kurabayashi et al. | 524/462 |
| 6,001,466 A | 12/1999 | Noguchi et al. | 428/327 |
| 6,027,210 A | 2/2000 | Kurabayashi et al. | 347/100 |
| 6,056,811 A | 5/2000 | Shimomura et al. | 106/31.36 |
| 6,076,919 A | 6/2000 | Shirota et al. | 347/60 |
| 6,143,363 A | 11/2000 | Noguchi et al. | 427/261 |
| 6,214,963 B1 | 4/2001 | Noguchi et al. | 528/71 |
| 6,238,045 B1 | 5/2001 | Ono et al. | 347/96 |
| 6,322,209 B1 | 11/2001 | Sato et al. | 347/105 |
| 6,341,855 B1 | 1/2002 | Kurabayashi | 347/100 |
| 6,342,096 B1 | 1/2002 | Kurabayashi | 106/31.27 |
| 6,344,526 B1 | 2/2002 | Noguchi et al. | 525/527 |
| 6,354,698 B1 | 3/2002 | Tachihara et al. | 347/56 |
| 6,367,921 B1 | 4/2002 | Kurabayashi et al. | 347/100 |
| 6,391,947 B1 | 5/2002 | Noguchi et al. | 524/84 |
| 6,398,355 B1 | 6/2002 | Shirota et al. | 347/100 |
| 6,399,674 B1 | 6/2002 | Kashiwazaki et al. | 523/161 |
| 6,412,936 B1 | 7/2002 | Mafune et al. | 347/100 |
| 6,428,862 B1 | 8/2002 | Noguchi | 427/511 |
| 6,448,346 B1 | 9/2002 | Noguchi et al. | 525/527 |
| 6,460,988 B1 | 10/2002 | Mafune et al. | 347/100 |
| 6,460,989 B1 | 10/2002 | Yano et al. | 347/101 |
| 6,471,757 B1 | 10/2002 | Koitabashi et al. | 106/31.28 |
| 6,472,129 B2 | 10/2002 | Noguchi et al. | 430/326 |
| 6,500,875 B2 | 12/2002 | Noguchi | 522/42 |
| 6,503,307 B1 | 1/2003 | Noguchi | 106/31.27 |
| 6,517,199 B1 | 2/2003 | Tomioka et al. | 347/101 |
| 6,521,323 B1 | 2/2003 | Sakaki et al. | 428/195 |
| 6,536,890 B1 | 3/2003 | Kato et al. | 347/100 |
| 6,552,156 B2 | 4/2003 | Noguchi et al. | 528/71 |
| 6,702,882 B2 | 3/2004 | Yakushigawa et al. | 106/31.27 |
| 6,706,100 B2 | 3/2004 | Mafune et al. | 106/31.27 |
| 6,706,104 B2 | 3/2004 | Takuhara et al. | 106/31.6 |
| 6,719,420 B2 | 4/2004 | Tomioka et al. | 347/100 |
| 6,746,114 B2 | 6/2004 | Takahashi et al. | 347/100 |
| 6,761,431 B2 | 7/2004 | Noguchi et al. | 347/45 |
| 6,780,901 B1 | 8/2004 | Endo et al. | 523/160 |
| 6,790,875 B2 | 9/2004 | Noguchi et al. | 522/84 |
| 6,790,878 B2 | 9/2004 | Kurabayashi | 523/160 |
| 6,794,427 B2 | 9/2004 | Kurabayashi et al. | 523/161 |
| 6,821,328 B2 | 11/2004 | Tomioka et al. | 106/31.33 |
| 6,843,839 B2 | 1/2005 | Kanke et al. | 106/31.47 |
| 6,863,392 B2 | 3/2005 | Shimomura et al. | 347/100 |
| 6,866,380 B2 | 3/2005 | Yakushigawa et al. | 347/100 |
| 6,966,944 B2 | 11/2005 | Shimomura et al. | 106/31.43 |
| 7,025,817 B2 | 4/2006 | Kanke et al. | 106/31.51 |
| 2002/0065335 A1* | 5/2002 | Noguchi et al. | 522/84 |
| 2003/0222961 A1* | 12/2003 | Nakajima | 347/102 |
| 2004/0074418 A1 | 4/2004 | Mafune et al. | 106/31.27 |
| 2004/0101291 A1* | 5/2004 | Takabayashi et al. | 386/125 |
| 2005/0005818 A1 | 1/2005 | Sato et al. | 106/31.27 |
| 2005/0284332 A1 | 12/2005 | Shinjo et al. | 106/31.27 |
| 2005/0288384 A1 | 12/2005 | Kanke et al. | 522/6 |
| 2006/0000386 A1 | 1/2006 | Hakamada et al. | 106/31.13 |
| 2006/0004116 A1 | 1/2006 | Kishi et al. | 522/146 |
| 2006/0007289 A1 | 1/2006 | Nito et al. | 347/100 |

FOREIGN PATENT DOCUMENTS

| | | |
|---|---|---|
| JP | 59-123670 | 7/1984 |
| JP | 3-258867 | 11/1991 |
| JP | 11-188870 | 7/1999 |
| JP | 2962880 B2 | 10/1999 |
| JP | 2000-117960 | 4/2000 |
| JP | 2000117960 A * | 4/2000 |
| JP | 2000-159621 | 6/2000 |
| JP | 2000-186242 | 7/2000 |
| JP | 324949 B2 | 1/2002 |
| JP | 2002-187918 | 7/2002 |
| JP | 2003-213170 | 7/2003 |

* cited by examiner

FIGURE
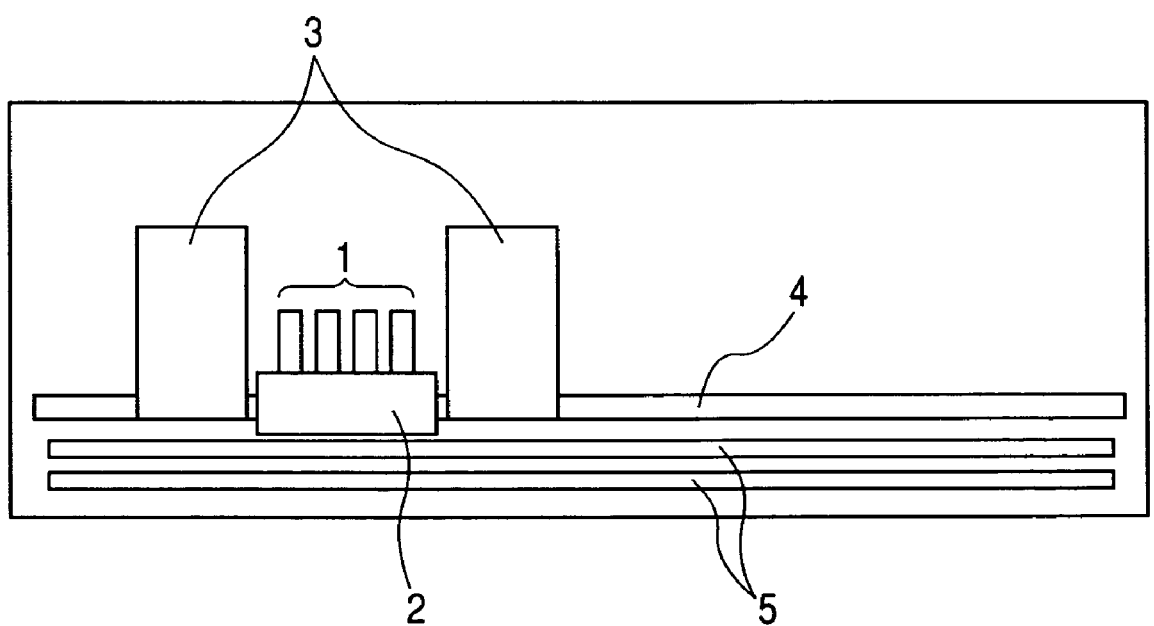

ACTIVE ENERGY RAY CURABLE AQUEOUS INK COMPOSITION, AND INKJET RECORDING METHOD, INK CARTRIDGE, RECORDING UNIT, AND INKJET RECORDING APPARATUS USING THE SAME

This application is a continuation of International Application No. PCT/JP2005/006435, filed Mar. 25, 2005, which claims the benefit of Japanese Patent Application No. 2004-092371, filed Mar. 26, 2004.

BACKGROUND OF THE INVENTION

1. Field of the Invention

The present invention relates to a novel active energy ray curable aqueous ink composition exhibiting excellent curing performance by including a water-soluble polymerizable substance having high reactivity which undergoes radical polymerization by active energy rays and a water-soluble polymerization initiator having high initiation efficiency which generates radicals by active energy rays, and to an inkjet recording method, ink cartridge, recording unit, and inkjet recording apparatus using the active energy ray curable aqueous ink composition.

2. Related Background Art

Active energy ray curable aqueous ink can be preferably used for image printing, pretreatment for providing printability to a recording medium, aftertreatment for protection or decoration of the printed image, and the like. Further, the active energy ray curable aqueous ink technology has numerous excellent features and possibilities in that the ink can keep up with tightening of regulations on. VOC, can be applied to a high density inkjet recording head through reduction of ink viscosity, etc.

A polymerizable substance which undergoes radical polymerization by active energy rays (hereinafter, referred to as polymerizable substance) and a polymerization initiator which generates radicals by active energy rays (hereinafter, referred to as polymerization initiator), which are basic components of the active energy ray curable aqueous ink, each had been generally prepared in a form of emulsion in a water-based solvent initially. However, the polymerizable substance and the polymerization initiator themselves must be water-soluble or hydrophilic to prepare homogenous ink from the viewpoints of film formation properties of the ink during polymerization, discharge stability thereof applied to an inkjet system, and the like.

A first example of a water-soluble or hydrophilic polymerizable substance in practical use is a compound having an acidic group, and a (meth)acryloyl group or vinyl group in a molecule such as an ester of succinic anhydride and 2-hydroxyethyl(meth)acrylate, an ester of phthalic anhydride and 2-hydroxyethyl(meth)acrylate, or vinylnaphthalene sulfonic acid.

A second example of the water-soluble or hydrophilic polymerizable substance in practical use is a (meth)acrylic ester of a polyhydric alcohol provided with hydrophilicity by a polyethylene oxide chain such as tetraethylene glycol di(meth)acrylate, which is an industrially produced compound having two or more polymerizable functional groups.

Another example thereof is a (meth)acrylic ester of a hydrophilic polyepoxide derived from a polyhydric alcohol such as glycerin, disclosed in Japanese Patent Application Laid-Open No. 2000-117960.

Examples of a water-soluble or hydrophilic polymerization initiator include: a hydroxyphenyl ketone polymerization initiator provided with water-solubility through addition of a polyethylene oxide chain, disclosed in Japanese Patent Application Laid-Open No. 2000-186242; and a thioxanthone polymerization initiator provided with water-solubility through addition of a polyethylene oxide chain or an anionic functional group, disclosed in Japanese Patent Application Laid-Open No. 2002-1879 18. Further, Japanese Patent Application Laid-Open No. S57-197289 discloses an invention relating to an acylphosphine oxide polymerization initiator having an ionic group as a polymerization initiator useful for polymerization of an aqueous polymerizable composition such as a coating material, a printing ink, an unsaturated polyester molding material, or a recording material.

Further, Japanese Patent Application Laid-Open No. 2000-159621 discloses an invention in which the water-soluble acylphosphine oxide polymerization initiator described in Japanese Patent Application Laid-Open No. S57-197289 is used as a polymerizable composition for dental use.

Active energy ray curable aqueous ink has excellent properties as described above, but degradation of its curing performance through dilution with water is pointed out in some cases. The curing performance may be improved by increasing contents of a polymerizable substance and polymerization initiator. However, when active energy ray curable aqueous ink is applied to an inkjet system, the ink is subjected to limitation in viscosity or the like. As a result, the curing performance greatly varies depending on properties of individual materials.

Active energy ray curable aqueous ink preferably applied to the inkjet system must include a water-soluble polymerizable substance which is formed of a material having low viscosity and favorable flowability applicable to high density nozzles, which can be added to the ink in a large amount, and which provides excellent hardness of an ink film or excellent adhesion of the ink film on to a recording medium after curing. The active energy ray curable aqueous ink preferably applied thereto must further include a water-soluble polymerization initiator which highly responds to irradiation of active energy rays in a short period of time, which can generate large amounts of radicals, and which provides excellent initiation efficiency.

The polymerizable substance in the first example has one polymerizable functional group in a molecule, and has a low polymerization rate and a very low degree of crosslinking of a cured product. Thus, the polymerization substance cannot serve as a main material for the aqueous polymerizable composition.

The polymerizable substance of the second example is not water-soluble if a length of an ethylene oxide chain is short. In contrast, if the length of the ethylene oxide chain is long, the polymerizable substance is water-soluble, but has problems in that physical properties of a polymerized or cured solid are often insufficient in performance such as hardness and adhesiveness, required for paint or ink.

The polymerizable substance disclosed in Japanese Patent Application Laid-Open No. 2000-117960 is highly water-soluble, has a high polymerization rate by active energy rays, and has excellent physical properties of a cured product. However, the polymerizable substance has such a feature that it has numerous hydroxyl groups and thus has a slightly high viscosity. Thus, the polymerizable substance may be added to ink in a small amount.

The polymerization initiator disclosed in Japanese Patent Application Laid-Open No. 2000-186242 is liquid, has excellent compatibility with water and a polymerizable substance, but provides slightly insufficient initiation efficiency. The polymerization initiator disclosed in Japanese Patent Application Laid-Open No. 2002-187918 is the type of hydrogen abstraction and requires a hydrogen donor such as tertiary amine. Further, the polymerization initiator is colored and is not suitable for clear ink. The polymerization initiator disclosed in Japanese Patent Application Laid-Open No. S57-197289 has features of high quantum yield of radical generation, high reactivity of radicals having unpaired electrons on a phosphorus atom, and long actual life of generated radicals. Thus, the polymerization initiator has high initiation efficiency and favorable water-solubility.

The water-soluble polymerization initiator disclosed in Japanese Patent Application Laid-Open No. S57-197289 has excellent properties as described above, but an actual application thereof remains as the dental material described in Japanese Patent Application Laid-Open No. 2000-159621 or the like. In this application, an irradiation time of the active energy rays is not particularly limited, and thus the initiation efficiency is not a required item.

High initiation efficiency is effective in applications requiring high curing rate of printing ink or the like. Such application presumably has not been tried because of insufficient reactivity of a water-soluble polymerizable substance combined with a polymerization initiator.

In contrast, performance of the entire aqueous polymerizable composition may significantly degrade because of insufficient initiation efficiency of a water-soluble polymerization initiator combined with a water-soluble polymerizable substance having high reactivity.

As described above, the inventors of the present invention have found for the first time that a combination of two factors including reactivity of a water-soluble polymerizable substance and initiation efficiency of a water-soluble polymerization initiator must be focused for ensuring sufficient curing performance as an active energy ray curable aqueous ink composition and obtaining adaptability to a wide range of applications.

SUMMARY OF THE INVENTION

Therefore, a first object of the present invention is to provide an active energy ray curable aqueous ink composition exhibiting excellent curing performance by including a water-soluble polymerizable substance having high reactivity and a water-soluble polymerization initiator having high initiation efficiency.

A second object of the present invention is to provide an active energy ray curable aqueous ink composition exhibiting excellent curing performance and suitably applied to an inkjet system by including a water-soluble polymerizable substance having high reactivity and a water-soluble polymerization initiator having high initiation efficiency.

A third object of the present invention is to provide an inkjet recording method, ink cartridge, recording unit, and inkjet recording apparatus all using the active energy ray curable aqueous ink composition.

The above-described objects can be attained by the present invention. That is, the present invention relates to an active energy ray curable aqueous ink composition including at least water, a polymerizable substance which undergoes radical polymerization by active energy rays, and a polymerization initiator which generates radicals by active energy rays, characterized in that: the polymerizable substance is a water-soluble compound having 2 to 6 (meth)acrylic groups, and the polymerization initiator is a water-soluble acylphosphine oxide compound.

Further, the present invention relates to an inkjet recording method including the steps of: discharging the aqueous ink composition to a recording medium by using an inkjet system; and curing the aqueous ink composition by irradiating the recording medium provided with the aqueous ink composition with active energy rays.

Further, the present invention relates to an ink cartridge including an ink container containing the aqueous ink composition.

Further, the present invention relates to a recording unit including an ink container containing the aqueous ink composition, and a recording head for discharging the aqueous ink composition.

Further, the present invention relates to an inkjet recording apparatus including means for providing the aqueous ink composition to a recording medium, and means for irradiating the aqueous ink composition provided on the recording medium with active energy rays.

An aspect of the present invention provides an active energy ray curable aqueous ink composition exhibiting excellent curing performance and suitably used for an inkjet system. That is, the aspect of the present invention provides an active energy ray curable aqueous ink composition exhibiting excellent curing performance by including a water-soluble polyfunctional acrylic compound having high reactivity as a polymerizable substance, and a water-soluble acylphosphine oxide compound having high initiation efficiency as a polymerization initiator.

Another aspect of the present invention provides an active energy ray curable aqueous ink composition exhibiting excellent curing performance and suitably used for an inkjet system, and a recording method including the steps of providing the active energy ray curable aqueous ink composition to a recording medium by using an inkjet system, and curing the aqueous ink composition by immediately irradiating the recording medium with active energy rays. Thus, an image having high quality and high fastness can be formed on a recording medium with high absorbency such as plain paper.

BRIEF DESCRIPTION OF THE DRAWING

FIGURE is a schematic front view of a printer preferably used for an inkjet recording method according to the present invention.

DETAILED DESCRIPTION OF THE PREFERRED EMBODIMENTS

Hereinafter, the present invention will be described more specifically by way of preferred embodiments. The inventors of the present invention have conducted studies in view of the above-described objects, and have prepared an active energy ray curable aqueous ink composition, including at least water, a polymerizable substance which undergoes radical polymerization by active energy rays, and a polymerization initiator which generates radicals by active energy rays, in which the polymerizable substance is a water-soluble compound having 2 to 6 (meth)acrylic groups, and the polymerization initiator is a water-soluble acylphosphine oxide compound. The inventors of the present invention have evaluated the active energy ray curable aqueous ink composition through irradiation of active energy rays. As a result, the inventors have found that the active energy ray curable aqueous ink composition having such a constitution exhibits excellent curing performance, to thereby complete the present invention.

That is, the active ray aqueous ink composition of the present invention presumably exhibits excellent curing performance although it is diluted with water by including both a water-soluble polyfunctional acrylic compound as a polymerizable substance having excellent reactivity depending on the number of functional groups, small acrylic equivalent weight, or a hydrogen bond formed between hydroxyl groups; and a water-soluble acylphosphine oxide compound as a polymerization initiator having high initiation efficiency depending on high quantum yield of radical generation, high reactivity of radicals having unpaired electrons on a phosphorus atom, or long actual life of generated radicals.

Hereinafter, description is given of functions and effects of printing by using an aqueous inkjet system, which is a main application of the active energy ray curable aqueous ink composition of the present invention.

Examples of the active energy rays that can be used in the present invention include ultraviolet light and electron beams. Hereinafter, a UV-curable aqueous ink composition which is cured by using particularly preferable ultraviolet light may be used as a typical example in descriptions, but the descriptions do not imply that the active energy rays are limited to ultraviolet light.

Main purposes for use of the active energy ray curable aqueous ink composition of the present invention for image formation by using an aqueous inkjet system are those described below, for example.

1) To enhance drying properties of ink, and allow improvement in printing speed.

2) To use a water-soluble polymerizable substance as a binder for a coloring material, and allow formation of an image with excellent rub-off resistance on various recording media.

3) To reduce scattering of light by pigment particles, and allow formation of a transparent ink layer.

4) To expand a range of color reproduction of process colors, and allow formation of an image with high density, excellent chroma, and excellent brightness.

5) To allow protection of a coloring material from active light, and gas components and moisture in air.

The active energy ray curable aqueous ink composition of the present invention exhibits a significant effect of improving such properties as chroma of a coloring material and rub-off resistance of a recording medium having ink absorbency such as plain paper, for which such properties are hardly improved. Further, the active energy ray curable aqueous ink composition of the present invention allows printing of a nonabsorbent recording medium with an aqueous ink.

It is necessary that the active energy ray curable aqueous ink composition of the present invention have a viscosity within an appropriate range to be used for an inkjet system. In addition it is preferable that the ink composition has an optimized surface tension for formation of a high quality, high density image particularly on plain paper from the viewpoint of a balance between curing and permeation.

Next, detailed description is given of components of the active energy ray curable aqueous ink composition of the present invention having excellent functions and effects as described above, and an inkjet recording method using the active energy ray curable aqueous ink composition.

(Active Energy Ray Curable Aqueous Ink Composition)

The active energy ray curable aqueous ink composition of the present invention includes at least water, a water-soluble compound having 2 to 6 (meth)acrylic groups as a polymerizable substance which undergoes radical polymerization by active energy rays, and a water-soluble acylphosphine oxide compound as a polymerization initiator which generates radicals by active energy rays. The active energy ray curable aqueous ink composition may further include an aqueous coloring material, other water-soluble polymerization initiators, an aqueous solvent, arbitrary additives, and the like.

(Water-Soluble Polymerizable Substance)

Description is given of a polymerizable substance preferably used in the present invention. The polymerizable substance is a water-soluble compound having 2 to 6 (meth) acrylic groups, preferably a water-soluble (meth)acrylate compound represented by the following general formula (1).

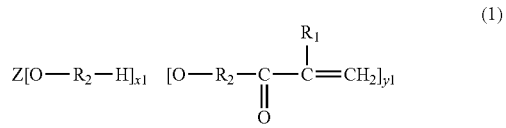

(In the general formula (1), Z represents a residue of a polyol or an epoxy ester of a polyol having (x1+y1) hydroxyl groups; x1 represents an integer of 0 to 2; y1 represents an integer of 2 to 6; and x1+y1 represents an integer of 2 to 6. $R_1$ each independently represent a hydrogen atom or a methyl group. $R_2$ each independently represent an atomic group A represented by the following formula.

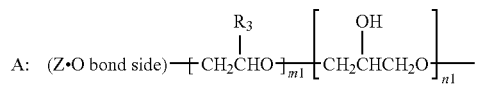

(In the formula: $R_3$ each independently represent a hydrogen atom or a methyl group; m1 represents an integer of 1 to 5; and n1 represents 0 or 1.))

The water-soluble polymerizable substance preferably used in the present invention has preferably 2 to 6 polymerizable functional groups, more preferably 3 to 6 polymerizable functional groups. A larger number of polymerizable functional groups further improve a curing rate. However, the molecule of the polymerizable substance becomes a giant one, and the viscosity of the ink composition increases. In this case, an addition amount of the polymerizable substance is limited, and much improvement in curing performance of the active energy ray curable aqueous ink composition used for an inkjet system cannot be expected, in particular. It should be taken into consideration that a high curing rate suppresses diffusion of molecules at an early stage of polymerization, and unreacted polymerizable functional groups are apt to remain. In contrast, a water-soluble polymerizable substance having one polymerizable functional group is not preferable because of a low curing rate and a significantly low degree of crosslinking. The polymerizable functional group preferably includes a (meth)acrylic group, more preferably an acrylic group from the viewpoint of curing performance.

Further, the polymerizable substance has preferably 1 to 5, more preferably 1 to 3 ethylene oxide chains or propylene oxide chains for providing water-solubility thereto. Long ethylene oxide chains or propylene oxide chains provide water-solubility, but provides insufficient hardness of a film, poor adhesiveness of the film onto a recording medium after curing, and the like. The polymerizable substance preferably further has a glycidyl group for attaining both water-solubility and curing performance. A hydrogen bond formed between hydroxyl groups of the glycidyl group may increase the viscosity of the ink composition to limit its addition amount. However, curing performance of the active energy ray curable aqueous ink composition is sufficiently ensured by combination of the polymerizable substance with the water-soluble polymerization initiator of the present invention with excellent initiation efficiency.

The polyol residue represented by Z is one obtained by removing two or more hydroxyl groups from a polyol. Examples of preferable polyols include ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentanediol, 2-methyl-2,4-pentanediol, 1,5-hexanediol, 1,6-hexanediol, 2,5-hexanediol, glycerin, 1,2,4-butanetriol, 1,2,6-hexanetriol, 1,2,5-pentanetriol, thiodiglycol, trimethylolpropane, ditrimethylolpropane, trimethylolethane, ditrimethylolethane, neopentyl glycol, pentaerythritol, dipentaerythritol, and a condensate thereof. Examples of other polyols include, but are not limited to, low molecular weight vinyl alcohols; monosaccharides such as triose, tetrose (erythritol or threitol), pentose (ribitol, arabinitol, or xylitol), hexose (allitol, altritol, glucitol, mannitol, iditol, galactitol, or inositol), heptose, octose, nonose and decose, and deoxy sugars thereof; aldonic acid and aldaric acid derivatives.

Of those, examples of particularly preferable polyols include glycerin, 1,2,4-butanetriol, 1,2,6-hexanetriol, 1,2,5-pentanetriol, trimethylolpropane, trimethylolethane, neopentyl glycol, and pentaerythritol.

Specific examples of a particularly preferable water-soluble polymerizable substance include water-soluble compounds having the following structures, but the water-soluble polymerizable substance used in the present invention is not limited thereto.

acylphosphine oxide compound and an anionic water-soluble acylphosphine oxide compound represented by the following general formula (2).

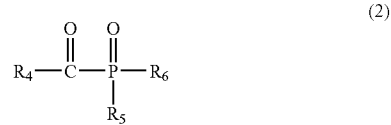

(In the general formula (2), $R_4$ represents an alkyl group or a phenyl group; $R_5$ represents an alkyloxy group or a phenyl group; and $R_6$ represents an atomic group B represented by the following formula.

Exemplified Compound 1

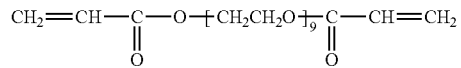

Exemplified Compound 2

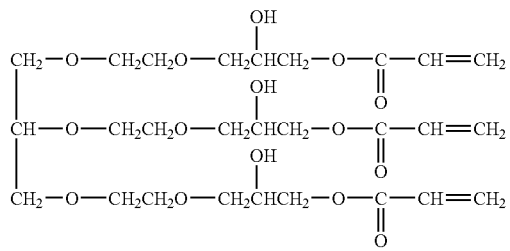

Exemplified Compound 3

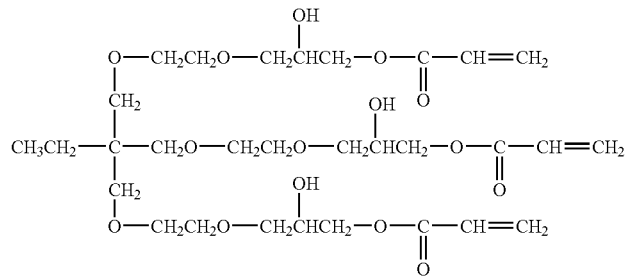

Exemplified Compound 4

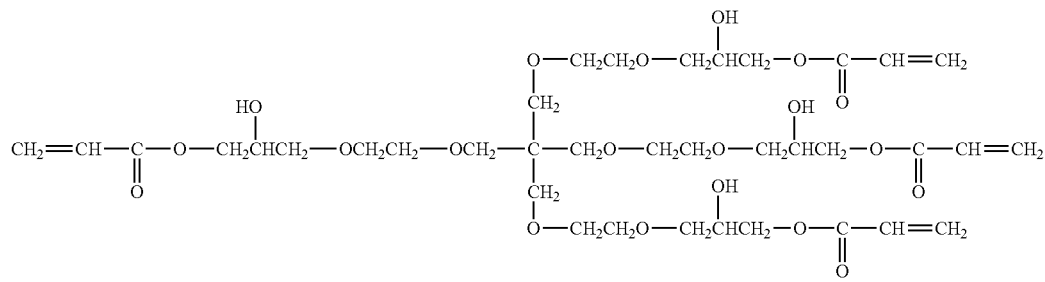

Of those, Exemplified Compounds 2, 3, and 4 are particularly preferable.

(Water-Soluble Polymerization Initiator)

Description is given of a polymerization initiator preferably used in the present invention. Examples of the polymerization initiator include a water-soluble acylphosphine oxide compound, preferably one of a nonionic water-soluble

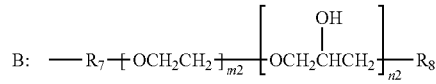

(In the formula, $R_7$ represents —$[CH_2]_{x2}$— (x2 represents 0 or 1) or a phenylene group; m2 represents an integer of 0 to 10; and n2 represents 0 or 1. $R_8$ represents a hydrogen atom, a sulfonic group, a carboxyl group, a hydroxyl group, or a salt thereof.)) The alkyl group or phenyl group represented by $R_4$ may have a substituent. Examples of the substituent include a halogen, a lower alkyl group having 1 to 5 carbon atoms, a lower alkyloxy group having 1 to 5 carbon atoms, the above atomic group B, a sulfonic group, a carboxyl group, a hydroxyl group, and salts of a sulfonic group, a carboxyl group, and a hydroxyl group (—$SO_3M$, —$CO_2M$, and —OM). M each independently represent a hydrogen atom, an alkali metal, an alkali earth metal, or ammonium represented by $HNR_9R_{10}R_{11}$ ($R_9$, $R_{10}$ and $R_{11}$ each independently represent a hydrogen atom, a lower alkyl group having 1 to 5 carbon atoms, a monohydroxyl-substituted lower alkyl group having 1 to 5 carbon atoms, or a phenyl group).

$R_4$ is particularly preferably a phenyl group having as a substituent a lower alkyl group having 1 to 5 carbon atoms.

The phenylene group represented by $R_7$ may have a substituent. Examples of the substituent include a halogen, a lower alkyl group having 1 to 5 carbon atoms, a lower alkyloxy group having 1 to 5 carbon atoms, a sulfonic group, a carboxyl group, a hydroxyl group, and salts of a sulfonic group, a carboxyl group, and a hydroxyl group (—$SO_3M$, —$CO_2M$, and —OM). M each independently represent a hydrogen atom, an alkali metal, an alkali earth metal, or ammonium represented by $HNR_9R_{10}R_{11}$ ($R_9$, $R_{10}$, and $R_{11}$ each independently represent a hydrogen atom, a lower alkyl group having 1 to 5 carbon atoms, a monohydroxyl-substituted lower alkyl group having 1 to 5 carbon atoms, or a phenyl group).

Examples of the salt represented by $R_8$ include —$SO_3M$, —$CO_2M$, and —OM. M each independently represent a hydrogen atom, an alkali metal, an alkali earth metal, or ammonium represented by $HNR_9R_{10}R_{11}$ ($R_9$, $R_{10}$, and $R_{11}$ each independently represent a hydrogen atom, a lower alkyl group having 1 to 5 carbon atoms, a monohydroxyl-substituted lower alkyl group having 1 to 5 carbon atoms, or a phenyl group).

The acylphosphine oxide polymerization initiator absorbs light of a longer wavelength region than that of a polymerization initiator generally used and has excellent light transmittance. Further, the acylphosphine oxide polymerization initiator generates acyl radicals, and phosphinoyl radicals with high reactivity by having unpaired electrons on phosphorus atoms through cleavage by irradiation of active energy rays, to thereby have high initiation efficiency. The cleavage causes reduction in absorption or color fading, and the acylphosphine oxide polymerization initiator can suppress coloring and be used forcuring of a thick film.

The acylphosphine oxide compound preferably used in the present invention provides water-solubility with a nonionic functional and/or anionic functional group. Examples of the nonionic functional group include but are not limited to a polyethylene oxide chain and a polypropylene oxide chain. Examples of the anionic functional group include but are not limited to a sulfonic group, a carboxyl group, a hydroxyl group, and salts thereof (—$SO_3M$, —$CO_2M$, and —OM (wherein, M preferably represents a hydrogen atom; an alkali metal such as lithium, sodium, or potassium; or ammonium such as ammonium, dimethylethanolammonium, methyldiethanolammonium, triethanolammonium, or anilinium).

Specific examples of a particularly preferable water-soluble polymerization initiator include water-soluble compounds having the following respective structures, but the water-soluble polymerization initiator used in the present invention is not limited thereto.

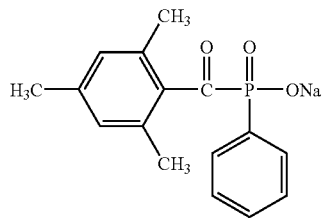

Exemplified Compound 5

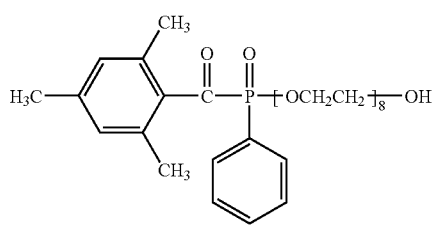

Exemplified Compound 6

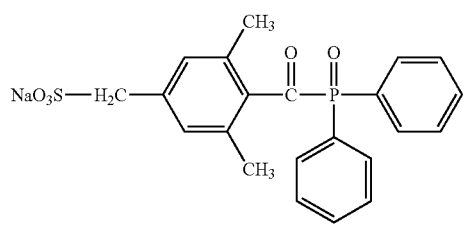

Exemplified Compound 7

(Coloring Material)

In the present invention, the addition of a coloring material provides a curable and colored active energy ray curable aqueous ink composition, and the application thereof to a multicolor inkjet system allows multicolor image formation. A basic factor required for a coloring material that can be preferably used for the active energy ray curable aqueous ink composition of the present invention is that compatibility between the water-soluble polymerizable substance and the water-soluble polymerization initiator, which is essential for providing active energy ray curable ink, be satisfied. To be specific, an aqueous pigment dispersion or aqueous dye having an anionic dissociation group may be preferably used.

(Anionic Aqueous Pigment Dispersion)

An example of a black pigment includes carbon black such as carbon black produced through a furnace process or a channel process. Carbon black that can be preferably used has such properties as a primary particle size of 15 to 40 µm; a specific surface area of 50 to 300 $m^2/g$ through a BET method; a DBP oil absorption of 40 to 150 ml/100 g; a volatile component of 0.5 to 10%; and a pH of 2 to 9. Examples of commercially available carbon black having such properties and that can be preferably used include: No. 2300, No. 900, MCF 88, No. 33, No. 40, No. 52, MA7, MA8, and No. 2200B (all available from Mitsubishi Chemical Corporation); RAVEN 1255 (available from Columbian Chemicals Co.); REGAL 400R, REGAL 330R, REGAL 660R, and MOGUL L (all available from Cabot Corporation); Color Black FW1, Color Black FW18, Color Black S170, Color Black S150, Printex 35, and Printex U (all available from Degussa Corporation).

Examples of a yellow pigment include Pigment Yellow 1, Pigment Yellow 2, Pigment Yellow 3, Pigment Yellow 12, Pigment Yellow 13, Pigment Yellow 14, Pigment Yellow 16, Pigment Yellow 17, Pigment Yellow 55, Pigment Yellow 73, Pigment Yellow 74, Pigment Yellow 75, Pigment Yellow 83, Pigment Yellow 93, Pigment Yellow 95, Pigment Yellow 97, Pigment Yellow 98, Pigment Yellow 109, Pigment Yellow 110, Pigment Yellow 114, Pigment Yellow 128, Pigment Yellow 138, Pigment Yellow 139, Pigment Yellow 150, Pigment Yellow 151, Pigment Yellow 154, Pigment Yellow 155, and Pigment Yellow 180.

Examples of a magenta pigment include Pigment Red 5, Pigment Red 7, Pigment Red 12, Pigment Red 48 (Ca), Pigment Red 48 (Mn), Pigment Red 57:1, Pigment Red 57 (Sr), Pigment Red 57:2, Pigment Red 122, Pigment Red 123, Pigment Red 168, Pigment Red 184, Pigment Red 202, and Pigment Red 238.

Examples of a cyan pigment include Pigment Blue 1, Pigment Blue 2, Pigment Blue 3, Pigment Blue 16, Pigment Blue 22, Pigment Blue 60, Pigment Blue 15:2, Pigment Blue 15:3, Vat Blue 4, and Vat Blue 60.

The pigment particles preferably have an average particle size of about 25 nm to 200 nm. The range varies depending on the use of a printed product but is sufficiently smaller than wavelengths of visible light and provides a printed product with sufficient transparency with little scattering of light.

(Anionic Aqueous Dye)

The use of a dye as a coloring material is different from the use of the pigment as a coloring material. The dye is hardly used without color fading by irradiation of active energy rays, and thus causes some color fading. For this reason, when a dye is used as a coloring material for ink, a so-called azo-containing dye forming a complex of metal ions is preferably used to suppress color fading. However, if a color loss level is not taken into consideration, a general water-soluble dye serves at least as an ink composition.

Examples of a black dye include monoazo or diazo complexes having polyvalent metals such as Cr, Cu, Mn, Al, Zn, and Fe coordinated thereon; and noncomplex azo black dyes. Examples thereof that can be preferably used include Direct Black 17, Direct Black 19, Direct Black 51, Direct Black 154, Direct Black 174, and Direct Black 195.

Examples of a yellow dye include Acid Yellow 11, Acid Yellow 17, Acid Yellow 23, Acid Yellow 25, Acid Yellow 29, Acid Yellow 42, Acid Yellow 49, Acid Yellow 61, Acid Yellow 71, Direct Yellow 12, Direct Yellow 24, Direct Yellow 26, Direct Yellow 44, Direct Yellow 86, Direct Yellow 87, Direct Yellow 98, Direct Yellow 100, Direct Yellow 130, Direct Yellow 132, and Direct Yellow 142.

Examples of a magenta dye include Acid Red 1, Acid Red 6, Acid Red 8, Acid Red 32, Acid Red 35, Acid Red 37, Acid Red 51, Acid Red 52, Acid Red 80, Acid Red 85, Acid Red 87, Acid Red 92, Acid Red 94, Acid Red 115, Acid Red 180, Acid Red 254, Acid Red 25.6, Acid Red 289, Acid Red 315, Acid Red 317, Direct Red 1, Direct Red 4, Direct Red 13, Direct Red 17, Direct Red 23, Direct Red 28, Direct Red 31, Direct Red 62, Direct Red 79, Direct Red 81, Direct Red 83, Direct Red 89, Direct Red 227, Direct Red 240, Direct Red 242, and Direct Red 243.

Examples of a cyan dye include Acid Blue 9, Acid Blue 22, Acid Blue 40, Acid Blue 59, Acid Blue 93, Acid Blue 102, Acid Blue 104, Acid Blue 113, Acid Blue 117, Acid Blue 120, Acid Blue 167, Acid Blue 229, Acid Blue 234, Acid Blue 254, Direct Blue 6, Direct Blue 22, Direct Blue 25, Direct Blue 71, Direct Blue 78, Direct Blue 86, Direct Blue 90, Direct Blue 106, and Direct Blue 199.

A preferable concentration of the dye in ink is 0.1 to 10% by mass with respect to the total amount of the ink. Ink having a low dye concentration is preferably used for, for example, a light-colored ink of the density modulation ink.

(Other Water-Soluble Polymerization Initiators)

In the present invention, other water-soluble polymerization initiators may be used in combination with the water-soluble acylphosphine oxide polymerization initiator. Preferable examples of the other water-soluble polymerization initiators include at least one compound selected from the group consisting of water-soluble compounds represented by the following respective general formulae (3) to (5).

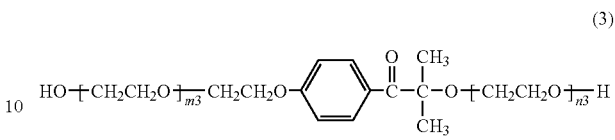

(3)

(In the general formula (3), m3 represents an integer of 1 or more; n3 represents an integer of 0 or more; and m3+n3 represents an integer of 1 to 8.)

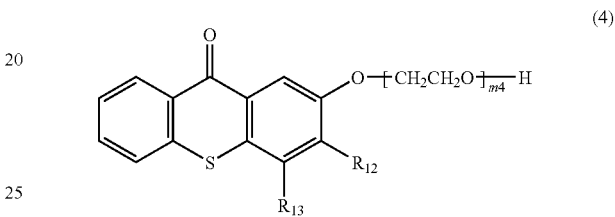

(4)

(In the general formula (4), $R_{12}$ and $R_{13}$ each independently represent a hydrogen atom or an alkyl group; and m4 represents an integer of 5 to 10.)

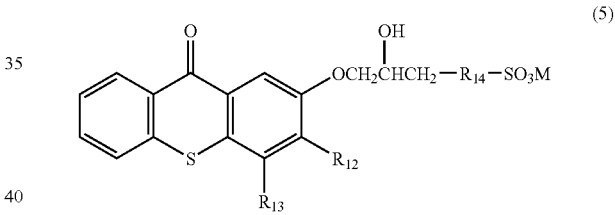

(5)

(In the general formula (5), $R_{12}$ and $R_{13}$ each independently represent a hydrogen atom or an alkyl group; $R_{14}$ represents —$[CH_2]_{x3}$— (x3 represents 0 or 1), —O—$[CH_2]_{y3}$— (y3 represents 1 or 2), or a substituted or unsubstituted phenylene group; and M represents a hydrogen atom or an alkali metal.)

An absorption region of the acylphosphine oxide polymerization initiator extends to a long wavelength region of 400 nm or more, and light of the long wavelength region easily penetrates into the inner part, therefore acylphosphine oxide polymerization initiator is superior to provide inner curing performance in a system containing a pigment. However, the acylphosphine oxide polymerization initiator (in particular, phosphinoyl radicals generated on phosphorus atoms) is easily affected by oxygen inhibition and may exhibit insufficient surface curing performance. In contrast, other polymerization initiators each having an absorption region in a short wavelength region may be added to aid curing of a surface layer.

The use of the thioxanthone polymerization initiator represented by the general formula (4) or (5) preferably involves addition of triethanolamine or the like as a hydrogen donor.

Specific examples of preferable other water-soluble polymerization initiators that can be used in combination with the acylphosphine oxide polymerization initiator include water-soluble compounds represented by the following respective structures. However, other water-soluble polymerization initiators usable in the present invention are not limited thereto.

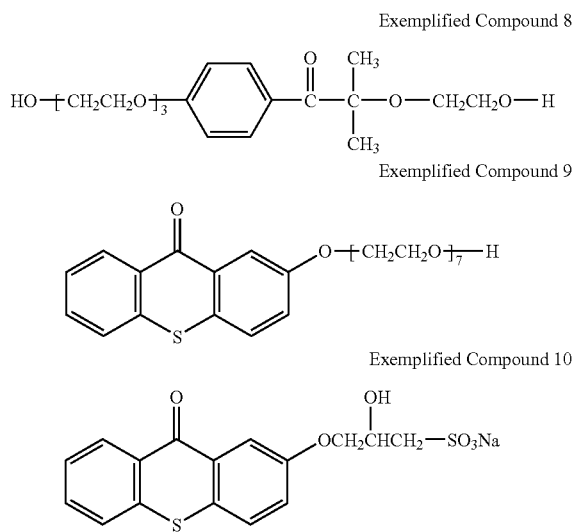

Exemplified Compound 8

Exemplified Compound 9

Exemplified Compound 10

(Solvent Component)

A slight amount of a solvent component is preferably added to the active energy ray curable aqueous ink composition of the present invention. The solvent component is added for conventional purposes such as provision of nonvolatile properties to the ink, reduction in viscosity of the ink, provision of wettability of the ink on a recording medium, and suppression of fixing of the ink to nozzles by maintaining dispersion stability of a pigment. In addition, the solvent component is added for the purpose of alleviating shrinkage on curing in a system with a high polymerization rate using a polymerizable substance having high reactivity and a high crosslinking density and a polymerization initiator having high initiation efficiency such as the active energy curing aqueous ink composition of the present invention. Further, when the polymerization advances to some extent in such system, diffusion of the polymerizable substance or the polymerization initiator is suppressed to inhibit increase of a final curing rate. The solvent component serves as an effective countermeasure thereto as well.

A printed mater obtained by using an inkjet system is often picked up and enjoyed by unspecified number of people. Therefore, it is important that a cured film having sufficient strength and flexibility be formed to provide fastness such that no peeling takes place from a recording medium.

The solvent is preferably selected from glycerin, ethylene glycol, diethylene glycol, and a mixture thereof having high inkjet recordability. The solvent is generally included in an amount of 0.5 to 5% by mass with respect to the total amount of the ink composition.

(Reactive Diluent Composition)

Water is mainly used as a solvent for diluting the water-soluble polymerizable substance or water-soluble polymerization initiator of the present invention, but a water-soluble, polymerizable, and low viscosity monomer may be used as a solvent. An advantage in the use of such substance and not a normal solvent lies in that the substance does not remain as a plasticizer in a solid after the curing by active energy rays, to thereby reduce its effect on the physical properties of the solid.

Examples of a reactive diluent solvent component selected for the above-described purpose include acryloylmorpholine, N-vinyl-2-pyrrolidone, N-vinylformamide, acrylamide, methylenebisacrylamide, monoacrylates of monosaccharides, a monoacrylic ester of an oligoethylene oxide, and a monoacrylic ester of a dibasic acid.

(Additives)

In the present invention, the active energy ray curable aqueous ink composition may further include arbitrary additives in addition to the above-described substances. Examples of the additives include a pH adjustor, a leveling agent, a viscosity modifier, an antioxidant, a hindered amine light stabilizer (HALS), an antiseptic, and a fungicide. The additives are generally used in an amount of 0.1 to 5% by mass with respect to the total amount of the ink composition.

(Preparation Of Clear Ink)

The active energy ray curable aqueous ink composition of the present invention may be transparent without the coloring material as described above, to be used as an undercoat for providing image printability to a recording medium, an overcoat for protecting a surface of an image formed with conventional ink and for further providing decoration or gloss thereto, or the like. The clear ink may contain as necessary a colorless pigment not used for coloring, fine particles, or the like dispersed therein. Such addition of the clear ink in an undercoat or an overcoat improves properties of the printed product such as image quality, fastness, and handling property.

The active energy ray curable aqueous ink composition of the present invention used for such clear ink preferably contains 10 to 70% by mass of the water-soluble polymerizable substance with respect to the total amount of the ink. Further, the clear ink is preferably prepared such that the clear ink contains 1 to 10 parts by mass of the polymerization initiator with respect to 100 parts by mass of the polymerizable substance, and at least 0.5 part by mass of the polymerization initiator with respect to 100 parts by mass of the ink composition.

(Components And Physical Properties Of Ink Composition Containing Coloring Material)

The active energy ray curable aqueous ink composition of the present invention using a coloring material such as a pigment preferably has a concentration of a pure pigment of about 0.3 to 10% by mass in an ink with respect to the total amount of the ink. Coloring power of the pigment varies depending on a dispersed state of the pigment particles, but the ink composition may be used as a light-colored ink when the pigment concentration falls within a range of about 0.3 to 1%. The ink composition having the pigment concentration out of the above range is used for general colored ink.

Regarding contents of other components, a water content is preferably 40 to 90% by mass, particularly preferably 60 to 75% by mass with respect to the total amount of the ink. Further, the content of the polymerizable substance in the ink is preferably 1% to 30% by mass, particularly preferably 5 to 20% by mass with respect to the total amount of the ink. The content of the polymerization initiator varies depending on the content of the polymerizable substance, but is preferably 0.1 to 7% by mass, particularly preferably 0.3 to 5% by mass with respect to the total amount of the ink.

In a case where the active energy ray curable aqueous ink composition of the present invention is applied to an inkjet system, nonlinearity is not found in a broad range of viscosity and the upper limit thereof is 15 mPa·s. In the case where the active energy ray curable aqueous ink composition is applied to an inkjet system provided with fine, high-density, and high-driving frequency nozzles, the upper limit of the viscosity is preferably 10 mPa·s.

The active energy ray curable aqueous ink composition preferably has a surface tension of 35 mN/m (dyne/cm) or more in view of printing on plain paper. For a normal aqueous inkjet ink, the surface tension is adjusted to a low value of about 30 mN/m, to allow permeation of the ink within a short period of time. Thus, a bleeding phenomenon is suppressed with reduction of image density. Meanwhile, flow of the active energy ray curable aqueous ink composition of the present invention can be suppressed by curing. Thus, the surface tension is increased to accumulate ink droplets on a surface layer of a recording medium as much as possible, to thereby satisfy bleeding properties and image density.

For ensuring image density, the ink droplets are required to be somewhat wet on a recording medium upon irradiation of active energy rays. Thus, the upper limit of the surface tension is preferably about 50 mN/m.

(Inkjet Recording Method)

Next, description is given of an inkjet recording method for applying the above-described active energy ray curable aqueous ink composition onto a recording medium by using an inkjet system, and irradiating the medium with an active energy ray to cure the ink composition.

(Printer System)

The above-described active energy ray curable aqueous ink composition according to the present invention is suitably used for an inkjet discharge type recording head, and is effectively applicable to an ink container containing the ink composition or ink to be filled in the container. In particular, the present invention produces beneficial effects when applied to a bubble-jet recording head and apparatus out of various inkjet recording heads and apparatuses.

As a typical arrangement or principle thereof, it is preferable to conform to the basic principle disclosed in, for example, U.S. Pat. No. 4,723,129 or U.S. Pat. No. 4,740,796. This system is applicable to both a so-called on-demand type and continuous type. The system is particularly effective in the on-demand type because at least one driving signal corresponding to recording information and inducing a rapid temperature rise beyond a film boiling point is applied to an electrothermal transducer arranged in a position corresponding to a sheet or liquid channel that retains ink, thereby causing the electrothermal transducer to generate thermal energy to cause film boiling on the heat acting surface of a recording head, and consequently forming bubbles in the ink in a one-to-one correspondence with the driving signals. Along with the growth and shrinkage of the bubbles, the ink is discharged from a discharge orifice to form at least one droplet. This driving signal is more preferably a pulsed signal because the bubble can promptly and appropriately grow and shrink, making it possible to discharge the ink with high responsiveness. This pulsed driving signal is preferably a signal described in U.S. Pat. No.4,463,359 or U.S. Pat. No. 4,345,262. Note that printing can be more efficiently performed under the conditions described in U.S. Pat. No. 4,313,124 that discloses the invention relating to the rate of temperature rise on the heat acting surface.

Regarding the arrangement of a recording head, it is possible to use, in addition to the combined arrangement (linear liquid channel or right-angled liquid channel) of the discharge orifices, liquid channels, and electrothermal transducers as disclosed in the specifications described above, arrangements in which the heat acting surface is in a bent region as disclosed in U.S. Pat. No. 4,558,333 and U.S. Pat. No. 4,459,600. Besides, the present invention is effectively applicable to a discharge system where a recording head communicates with the air as disclosed in Japanese Patent Nos. 2,962,880 and 3,246,949, and Japanese Patent Application Laid-Open No. H11-188870. In addition, the present invention is effective for the arrangement in which a common discharge orifice is used as a discharge portion of plural electrothermal transducers (Japanese Patent Application Laid-Open No. S59-123670, etc.). Furthermore, as a full-line type recording head having a length corresponding to the width of the maximum recording medium on which a recording apparatus can conduct recording, it is possible to use either the arrangement that ensures the full-line length by combining a plurality of recording heads as disclosed in the above specifications or the arrangement where plural recording heads are integrally formed into a single head. In either case, the present invention can enhance the above effects more effectively.

In addition, the present invention is effective in the case of using an exchangeable chip type recording head which can be electrically connected to an apparatus main body and can receive ink from the apparatus main body by being mounted to the apparatus main body or a cartridge type recording head, in which an ink tank is integrally set in the recording head itself. In the present invention, it is preferable to add recovery means for the recording head, preliminary auxiliary means, and the like as components of the recording apparatus used since the beneficial effects of the present invention can be attained in a more stable manner. Specific examples of such means include, for the recording head, capping means, cleaning means, pressurizing or suction means, and preliminary heating means using electrothermal transducers, another heating element, or a combination thereof. It is also effective for stable recording to set a preliminary discharge mode for discharge independent of printing.

A recording apparatus for implementing the recording method of the present invention includes, as illustrated in the schematic front view of a printer of FIGURE, an ink tank portion 1 containing the active energy ray curable aqueous ink composition of the present invention, a head portion 2 for actual recording (multi-head composed of a number of recording heads arranged in this case), a lamp portion 3 for applying UV light for curing the composition, a driving portion 4 for driving the head portion and lamp portion, and a sheet delivery portion 5 for feeding a recording medium on which recording is conducted. Note that a wiping portion, capping portion, sheet-feeding portion, and a driving motor portion (not shown) are provided aside from the above components.

In FIGURE, nozzle portions for discharging the active energy ray curable aqueous ink composition are symmetrically arranged for each color in the head portion 2. The head portion 2 and the lamp portion 3 are integrally moved laterally. Immediately after being applied to the recording medium, the active energy ray curable aqueous ink composition is irradiated with UV light (the lamps will be described in detail below). Hence, this recording apparatus enables inkjet recording methods capable of effectively suppressing bleeding of ink droplets during recording or bleeding between color inks on plain paper, and forming an image excelling in fastness as well.

In addition, the ink tank portion 1 includes four colors of black (Bk), cyan (C), magenta (M), and yellow (Y). However, another two colors of light cyan (LC) and light magenta (LM) may be added thereto thereby providing six colors in total with a view to recording (forming) an image of higher resolution. Further, black is inferior in responsiveness to other colors, so only three colors of cyan, magenta, and yellow may be arranged since process black can be created by mixing the three colors. In the present invention, the tank used has light-shielding property.

Note that in the present invention, it is possible to appropriately choose a system where a lamp is placed in front of the sheet delivery portion, a system where a recording medium is wound around a rotary drum upon sheet feeding/delivery, or a system where a drying portion is additionally provided aside from the above recording system.

(UV Irradiation Lamp)

Hereinafter, description is given of a UV irradiation lamp suitably used especially for curing the active energy ray curable aqueous ink composition according to the present invention. The UV irradiation lamp is preferably a so-called low-pressure mercury lamp such as has mercury vapor pressure of 1 to 10 Pa when turned on, a high-pressure mercury lamp, and a mercury-arc lamp coated with a phosphor. An emission spectrum of those mercury lamps in a UV range is 450 nm or shorter, particularly preferably 184 nm to 450 nm, which is suitable for efficiently inducing reaction of polymerizable materials in black or color ink. In addition, such lamps are preferred because, upon incorporating a power source to a printer, a compact one can be used. Examples of the mercury lamps that have been put into practical use include a metal halide lamp, a high-pressure mercury-arc lamp, an ultra-high-pressure mercury-arc lamp, a xenon flash lamp, a deep UV lamp, a lamp externally exciting a mercury-arc lamp by using microwave with no electrode, and a UV laser. An emission wavelength range includes the above range. Thus, any lamp can be basically applied if a power source size, an incident light intensity, and a lamp shape are met. A light source is selected according to sensitivity of a polymerization initiator used as well.

The requisite UV intensity is preferably 500 to 5,000 mW/cm² in a wavelength range effective for curing. A low cumulative intensity hinders the formation of an image of high quality and fastness. Further, excessively high irradiation intensity may damage the recording medium or cause color degradation of coloring materials.

EXAMPLES

Hereinafter, the present invention will be described more specifically by way of examples and comparative examples. However, the present invention is not limited to the following examples without departing from the scope of the present invention. It should be noted that the terms "part" and "%" refer to "part by mass" and "mass %" unless otherwise stated.

Synthesis Example 1

Synthesis of sodium 2,4,6-trimethylbenzoylphenylphosphinate (Exemplified Compound 5)

The synthesis of Exemplified Compound 5 as a target is disclosed in Japanese Patent Application Laid-Open No. S57-197289 mentioned above. However, according to the method described in the document, an alkyl iodide is produced as a by-product, so the mutagenicity of a methyl compound particularly shown as a preferable example in the document is doubtful. The possibility that such a substance is incorporated as an impurity is not preferable in terms of safety. In view of the above, in the present invention, an attempt was made to synthesize Exemplified Compound 5 by decomposing a commercially available bisacyl phosphine oxide compound under an acidic condition.

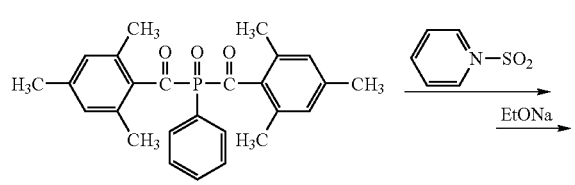 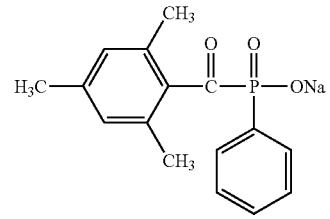

Dry pyridine containing no water was allowed to react with sulfuric anhydride in chloroform to prepare a pyridine sulfate according to an ordinary method. Next, 250 g of a 15% solution of phenyl-bis(2,4,6-trimethylbenzoyl)-phosphine oxide (trade name Irgacure 819: available from Ciba Specialty Chemicals) in pyridine was prepared, and was sufficiently refluxed for dehydration. 50 g of the pyridine sulfate was added to the resultant, and the whole was boiled under reflux for 5 hours. The reaction mixture was poured onto about 500 g of ice, and a 20% aqueous solution of sodium hydroxide was gradually added for neutralization. The resultant suspension was filtered, and the filtrate was distilled to remove remaining pyridine. After 1N HCl aq had been gradually added to the remaining water layer for neutralization, water was distilled off, followed by drying in a vacuum. The residue was recrystallized from a trace amount of ethanol, and was dried in a vacuum to yield about 20 g of 2,4,6-trimethylphenylphosphinic acid. The acid was dissolved into an excess amount of ethanol, and the solution was gradually added to a solution of sodium hydroxide in ethanol. The precipitate was filtered out, washed with cool ethanol, and dried in a vacuum to yield about 15 g of sodium 2,4,6-trimethylbenzoylphenylphosphinate (Exemplified Compound 5).

Synthesis Example 2

Synthesis Of Octaethylene Glycol 2,4,6-trimethylbenzoylphenylphosphinate

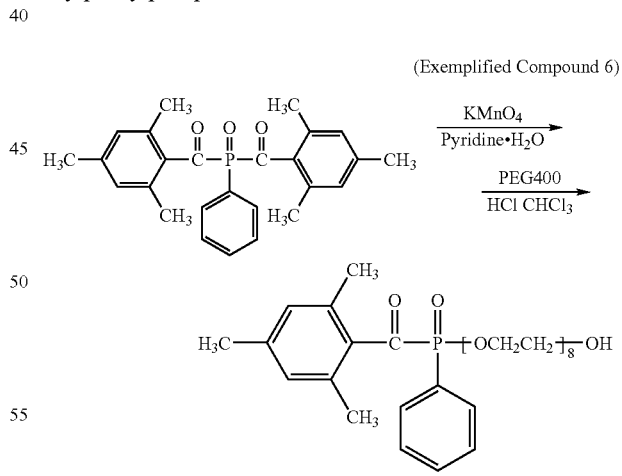

20 g of phenyl-bis(2,4,6-trimethylbenzoyl)-phosphine oxide (trade name Irgacure 819: available from Ciba Specialty Chemicals), 45 g of potassium permanganate, 600 ml of pyridine, and 300 ml of water were mixed, and the mixture was stirred under heating at 85° C. for 6 hours. After the reaction solution had been cooled to room temperature, the precipitated crystal was filtered out and washed with water. The filtrate was concentrated, and 150 ml of 10% HCl aq was added to the residue. The mixed solution was extracted with 200 ml of ethyl acetate 3 times. The organic layer was gathered, and was washed with 200 ml of a saturated salt solution twice and dried with anhydrous magnesium sulfate. The solution was concentrated and dried to yield 21 g of a pale yellow solid.

Next, 20 g of the solid, 600 g of polyethylene glycol 400, and 500 ml of chloroform were mixed, and the mixture was stirred under heating at 50° C. for 1 hour. After the reaction solution had been cooled to room temperature, water was added for separation, and the water layer was extracted with 1,200 ml of chloroform. The organic layer was gathered, and was washed with 1,000 ml of a saturated salt solution and dried with anhydrous magnesium sulfate. The solvent was distilled off under reduced pressure, and the residue was purified by means of silica gel chromatography to yield about 10 g of octaethylene glycol 2,4,6-trimethylbenzoylphenylphosphinate (Exemplified Compound 6).

Examples 1 to 10

The respective components shown in Table 1 below were mixed and sufficiently stirred for dissolution. After that, the solution was filtered through a 0.50-μm filter under pressure to prepare each of the inks of Examples 1 to 10. In addition, the pH of each ink was adjusted to have a final value of 8.5 by means of an aqueous solution of sodium hydroxide.

Comparative Examples 1 and 2

The respective components shown in Table 1 below were mixed and sufficiently stirred for dissolution. After that, the solution was filtered through a 0.50-μm filter under pressure to prepare each of the inks of Comparative Examples 1 and 2. In addition, the pH of each ink was adjusted to have a final value of 8.5 by means of an aqueous solution of sodium hydroxide.

Exemplified Compound 8 described above alone was used as a water-soluble polymerization initiator of Comparative Example 1. Exemplified Compound 11 shown below was used as a water-soluble polymerizable substance of Comparative Example 2.

Exemplified Compound 11

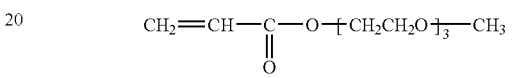

TABLE 1

Active energy ray curable ink aqueous compositions of examples and comparative examples

|  |  | Loading (wt %) | | | | | |
|---|---|---|---|---|---|---|---|
|  |  | Example 1 | Example 2 | Example 3 | Example 4 | Example 5 | Example 6 |
| Water-soluble polymerizable substance | Exemplified Compound 1 | 15 |  |  |  |  |  |
|  | Exemplified Compound 2 |  | 15 |  |  | 15 | 15 |
|  | Exemplified Compound 3 |  |  | 15 |  |  |  |
|  | Exemplified Compound 4 |  |  |  | 15 |  |  |
|  | Exemplified Compound 11 |  |  |  |  |  |  |
| Water-soluble polymerization initiator | Exemplified Compound 5 | 2 | 2 | 2 | 2 |  |  |
|  | Exemplified Compound 6 |  |  |  |  | 2 |  |
|  | Exemplified Compound 7 |  |  |  |  |  | 2 |
|  | Exemplified Compound 8 |  |  |  |  |  |  |
|  | Exemplified Compound 9 |  |  |  |  |  |  |
| Hydrogen donor | Triethanolamine |  |  |  |  |  |  |
| Solvent | Glycerin |  |  |  |  |  |  |
|  | Ethylene glycol |  |  |  |  |  |  |
| Colorant | Pigment Blue 15:3 Pigment dispersion (Pigment content 10%) | 40 | 40 | 40 | 40 | 40 | 40 |
| Reactive diluent | Acryloylmorpholine | 5 | 5 | 5 | 5 | 5 | 5 |
| pH adjustor | 0.2N NaOH Aqueous solution | Amount at which pH of ink becomes 8.5 | | | | | |
| Water | Ion-exchanged water | 38 | 38 | 38 | 38 | 38 | 38 |
| Surface tension (mN/m)/25° C. | | 41 | 43 | 43 | 44 | 43 | 42 |
| Viscosity (mPa · s)/25° C. | | 2.8 | 3.3 | 5.0 | 8.9 | 3.6 | 3.5 |

|  |  | Loading (wt %) | | | | | |
|---|---|---|---|---|---|---|---|
|  |  | Example 7 | Example 8 | Example 9 | Example 10 | Comparative Example 1 | Comparative Example 2 |
| Water-soluble polymerizable substance | Exemplified Compound 1 |  |  |  |  |  |  |
|  | Exemplified Compound 2 | 15 | 15 | 15 | 15 | 15 |  |
|  | Exemplified Compound 3 |  |  |  |  |  |  |
|  | Exemplified Compound 4 |  |  |  |  |  |  |
|  | Exemplified Compound 11 |  |  |  |  |  | 15 |
| Water-soluble polymerization initiator | Exemplified Compound 5 | 1.5 | 1.5 | 2 | 2 |  | 2 |
|  | Exemplified Compound 6 |  |  |  |  |  |  |
|  | Exemplified Compound 7 |  |  |  |  |  |  |
|  | Exemplified Compound 8 | 0.5 |  |  |  | 2 |  |
|  | Exemplified Compound 9 |  | 0.5 |  |  |  |  |

TABLE 1-continued

Active energy ray curable ink aqueous compositions of examples and comparative examples

| | | | | | | | |
|---|---|---|---|---|---|---|---|
| Hydrogen donor | Triethanolamine | | | 0.5 | | | |
| Solvent | Glycerin | | | | 2 | | |
| | Ethylene glycol | | | | | 2 | |
| Colorant | Pigment Blue 15:3 Pigment dispersion (Pigment content 10%) | 40 | 40 | 40 | 40 | 40 | 40 |
| Reactive diluent | Acryloylmorpholine | 5 | 5 | 5 | 5 | 5 | 5 |
| pH adjustor | 0.2N NaOH Aqueous solution | | | Amount at which pH of ink becomes 8.5 | | | |
| Water | Ion-exchanged water | 38 | 37.5 | 36 | 36 | 38 | 38 |
| | Surface tension (mN/m)/25° C. | 42 | 42 | 41 | 41 | 42 | 41 |
| | Viscosity (mPa·s)/25° C. | 3.5 | 3.4 | 3.5 | 3.6 | 3.7 | 2.3 |

(Evaluation of Curing Performance)

The active energy ray curable aqueous ink composition according to the present invention exhibits high curing performance even in a system with a pigment added and can correspond to high-speed printing on plain paper because the ink composition contains a water-soluble polyfunctional acrylic compound having high reactivity as a polymerizable substance, and a water-soluble acyl phosphine oxide compound having high initiation efficiency as a polymerization initiator. The curing performance was evaluated by means of modified a photo-differential scanning calorimetry (photo-DSC) device and a bubble jet printer equipped with a UV irradiation lamp.

(1) Photo-DSC Measurement

About 1.5 mg of each of the active energy ray curable aqueous ink compositions of Examples 1 to 10 according to the present invention and Comparative Examples 1 and 2 were weighed in an aluminum pan, and the aluminum pan was mounted on the photo-DSC device (manufactured by Mettler-Toledo K. K.) together with an empty aluminum pan for reference. After having been left standing under the atmosphere at 25° C. for 10 minutes, the pans were irradiated with ultraviolet light having an intensity of 400 mW/cm² at 365 nm for 0.1 second. The resultant DSC curve was normalized to a value per unit mass, and the gradient of calorific power/time (W/g·s) from the rise-up of an exothermic peak to the apex was measured and evaluated. The gradient is intended for comparing the responsiveness of curing with respect to a constant irradiation energy. The larger the gradient value is, the more excellent the curing performance is. Table 2 summarizes the results of the evaluation (Values each show a relative value when the value of Example 2 is set to be 1.0.).

(2) Printing Evaluation 1

Each of the active energy ray curable aqueous ink compositions of Examples 1 to 10 according to the present invention and Comparative Examples 1 and 2 was evaluated in accordance with the following method and criteria by means of a modified machine obtained by mounting a UV irradiation lamp (having a maximum radiation intensity of 1,500 mW/cm² in the range of 300 to 400 nm) on a bubble jet printer PIXUS 550i (manufactured by Canon Inc.) having an on-demand type multi-recording head for discharging ink by applying thermal energy corresponding to a recording signal to the ink so that the lamp would be adjacent to the recording head portion as show in FIGURE. Table 2 summarizes the results of the evaluation.

(2-1) Fixability

A 12-point letter pattern was printed on PPC paper (manufactured by Canon Inc.) with a predetermined ink by means of the modified machine and irradiated with ultraviolet light to prepare a sample. 10 seconds after the printing, Silbon paper (lens-cleaning paper) was put on the paper and was drawn in a state where a weight with a load of 40 g/cm² was mounted on a recorded surface. Whether or not contamination occurred at this time on a non-printed portion (white-background portion) of the recording medium and the Silbon paper owing to friction of a printed portion was visually observed and evaluated according to the following criteria.

A: Almost no contaminated part due to friction is observed.

B: A contaminated part due to friction is slightly observed.

C: A contaminated part due to friction is remarkable.

(2-2) Marker Resistance

A 12-point letter pattern was printed on PPC paper (manufactured by Canon Inc.) with a predetermined ink by means of the modified machine and irradiated with ultraviolet light to prepare a sample. 1 minute after the printing, a letter portion was marked once with a fluorescent yellow pen (BEAM-LINER-S; manufactured by Zebra Co., Ltd.) with an ordinary writing pressure, and then the presence or absence of disturbance of the letter was visually observed and evaluated according to the following criteria.

TABLE 2

Evaluation of polymerization performance

| | Example 1 | Example 2 | Example 3 | Example 4 | Example 5 | Example 6 | Example 7 | Example 8 | Example 9 | Example 10 | Comparative Example 1 | Comparative Example 2 |
|---|---|---|---|---|---|---|---|---|---|---|---|---|
| Photo-DSC | 0.8 | 1.0 | 1.1 | 1.3 | 1.0 | 1.1 | 1.2 | 1.1 | 1.0 | 1.0 | 0.6 | 0.4 |
| Fixability | B | A | A | A | A | A | A | A | A | A | B | B |

TABLE 2-continued

| | | | | | Evaluation of polymerization performance | | | | | | | |
|---|---|---|---|---|---|---|---|---|---|---|---|---|
| | Example 1 | Example 2 | Example 3 | Example 4 | Example 5 | Example 6 | Example 7 | Example 8 | Example 9 | Example 10 | Comparative Example 1 | Comparative Example 2 |
| Marker resistance | B | A | A | A | A | A | A | A | A | A | C | C |

A: Almost no disturbance of a letter due to a marker occurs.
B: Slight disturbance of a letter due to a marker occurs.
C: Disturbance of a letter due to a marker is remarkable.

(Evaluation of Film Performance)

The active energy ray curable aqueous ink composition according to the present invention exhibits high curing performance on account of such a reason as described above. However, the flexibility of the ink composition may reduce owing to shrinkage on curing so that the ink composition may become brittle. Alternatively, the adhesiveness of a cured film with respect to a recording medium may reduce so that the film is apt to be peeled off. According to the present invention, a small amount of aqueous solvent component may be added for the purpose of alleviating the shrinkage on curing or promoting an increase in final curing rate. The film performance was evaluated by means of a modified machine of a bubble jet printer equipped with a UV irradiation lamp.

A: Almost no change occurs in a film.
B: A crack slightly develops in a film and the film is slightly peeled off.
C: A crack remarkably develops in a film and the film is remarkably peeled off.

(3-2) Adhesiveness

A 300% solid pattern was printed on a white film, which was made of polyethylene terephthalate and had a uniform and clean surface, with a predetermined ink by means of the modified machine and irradiated with ultraviolet light to prepare a sample. 24 hours after the printing, a printing portion was scratched in a lattice fashion, and the scratches were covered with a tape. After that, the tape was peeled off and the ratio of adhering and remaining parts (remaining ratio) was visually observed and evaluated according to the following criteria.

TABLE 3

| | | | | | Evaluation of film performance | | | | | | | |
|---|---|---|---|---|---|---|---|---|---|---|---|---|
| | Example 1 | Example 2 | Example 3 | Example 4 | Example 5 | Example 6 | Example 7 | Example 8 | Example 9 | Example 10 | Comparative Example 1 | Comparative Example 2 |
| Strength/ flexibility | A | A | B | B | A | A | B | B | A | A | A | A |
| Adhesiveness | B | AA | AA | AA | AA | AA | AA | AA | AA | AA | A | C |

AA: A remaining ratio of 90% or more.
A: A remaining ration of 80% or more and less than 90%.
B: A remaining ratio of 70% or more and less than 80%.
C: A remaining ratio of less than 70%.

(3) Printing Evaluation 2

Each of the active energy ray curable aqueous ink compositions of Examples 1 to 10 according to the present invention and Comparative Examples 1 and 2 was evaluated in accordance with the following method and criteria by means of a modified machine obtained by mounting a UV irradiation lamp (having a maximum radiation intensity of 1,500 mW/cm$^2$ in the range of 300 to 400 nm) on a bubble jet printer PIXUS 550i (manufactured by Canon Inc.) having an on-demand type multi-recording head for discharging ink by applying thermal energy corresponding to a recording signal to the ink so that the lamp would be adjacent to the recording head portion as show in FIGURE. Table 3 summarizes the results of the evaluation.

(3-1) Strength/Flexibility

A 300% solid pattern was printed on a white film, which was made of polyethylene terephthalate and had a uniform and clean surface, with a predetermined ink by means of the modified machine and irradiated with ultraviolet light to prepare a sample. 10 minutes after the printing, the state of a film at the time of bending of the sample was visually observed and evaluated according to the following criteria.

(Evaluation of Image Performance)

The active energy ray curable aqueous ink composition according to the present invention exhibits high curing performance as described above. Therefore, the suppression of the blur of the letters or bleeding and a high image density are simultaneously achieved even in a state where the ink composition has a high surface tension and builds up on the surface layer of a recording medium. The image performance was evaluated by means of a modified machine of a bubble jet printer equipped with a UV irradiation lamp.

(4) Printing Evaluation 3

Each of the active energy ray curable aqueous ink compositions of Examples 1 to 10 according to the present invention and Comparative Examples 1 and 2 was evaluated in accordance with the following method and criteria by means of a modified machine obtained by mounting a UV irradiation lamp (having a maximum radiation intensity of 1,500 mW/cm$^2$ in the range of 300 to 400 nm) on a bubble jet printer PIXUS 550i (manufactured by Canon Inc.) having an on-demand type multi-recording head for discharging ink by applying thermal energy corresponding to a recording signal to the ink so that the lamp would be adjacent to the recording head portion as show in FIGURE. Table 4 summarizes the results of the evaluation.

(4-1) Image Density

A 100% solid pattern was printed on PPC paper (manufactured by Canon Inc.) with a predetermined ink by means of the modified machine and irradiated with ultraviolet light to prepare a sample. 24 hours after the printing, the reflection density was measured by means of a reflection densitometer Macbeth RD-918 (manufactured by Macbeth). The obtained result was evaluated according to the following criteria.

A: A reflection density of 1.3 or more.
B: A reflection density of 1.0 or more and less than 1.3.
C: A reflection density of less than 1.0.

(4-2) Letter Quality

A 16-point letter pattern was printed on PPC paper (manufactured by Canon Inc.) with a predetermined ink by means of the modified machine and exposed to light to prepare a sample. 24 hours after the printing, the sample was visually observed and the blur of the letters was evaluated according to the following criteria.

A: Almost no blur is observed.
B: Blurred letters are slightly observed.
C: A large number of blurred letters are observed.

(4-3) Bleeding

For each of Examples 1 to 10 and Comparative Examples 1 and 2, pigment species of the pigment dispersion was changed to Pigment Red 122 and Pigment Yellow 138 to prepare other aqueous active energy ray curable ink compositions, thereby providing a set of cyan, magenta, and yellow inks.

100% solid portions of cyan, magenta, and yellow were printed on PPC paper (manufactured by Canon Inc.) with a predetermined ink set by means of the modified machine so as to be adjacent to one another to prepare a sample. 24 hours after the printing, the degree of bleeding at a boundary between these colors was visually observed and evaluated according to the following criteria.

This application claims priority from Japanese Patent Application No. 2004-092371 filed Mar. 26, 2004, which is hereby incorporated by reference herein.

What is claimed is:

1. An active energy ray curable aqueous ink composition comprising at least water, a polymerizable substance which undergoes radical polymerization by an active energy ray, and a polymerization initiator which generates radicals by an active energy ray, wherein the polymerizable substance is a water-soluble (meth)acrylate compound represented by the following general formula (1):

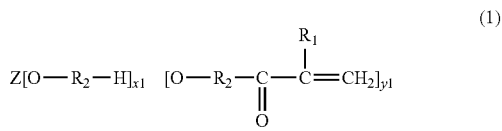

wherein Z represents a residue of a polyol or an epoxy ester of a polyol having (x1+y1) hydroxyl groups, x1 represents an integer of 0 to 2, y1 represents an integer of 2 to 6, and x1+y1 represents an integer of 2 to 6, $R_1$ each independently represent a hydrogen atom or a methyl group, and $R_2$ each independently represent an atomic group A represented by the following formula:

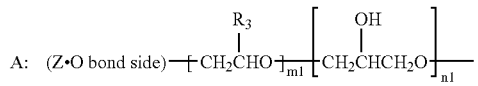

wherein $R_3$ each independently represent a hydrogen atom or a methyl group, m1 represents an integer of 1 to 5, and n1 represents 0 or 1, wherein the content of the water is 40 to 90% by mass with respect to the total amount of the aqueous ink composition, and wherein the polymerization initiator is either one of the following compounds:

TABLE 4

| | | | | | | | | | | | | |
|---|---|---|---|---|---|---|---|---|---|---|---|---|
| | Evaluation of image performance | | | | | | | | | | | |
| | Example 1 | Example 2 | Example 3 | Example 4 | Example 5 | Example 6 | Example 7 | Example 8 | Example 9 | Example 10 | Comparative Example 1 | Comparative Example 2 |
| Image density | B | A | A | A | A | A | A | A | A | A | B | C |
| Letter quality | A | A | A | A | A | A | A | A | A | A | B | B |
| Bleeding | B | A | A | A | A | A | A | A | A | A | C | B |

A: Almost no bleeding is observed.
B: Bleeding is slightly observed but is acceptable.
C: Bleeding occurs to such an extent that a boundary between colors is unclear.

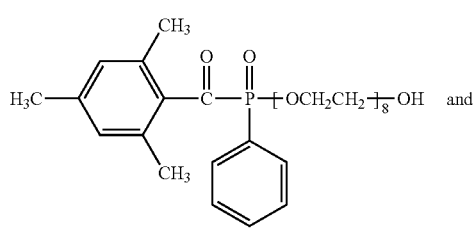
and
-continued
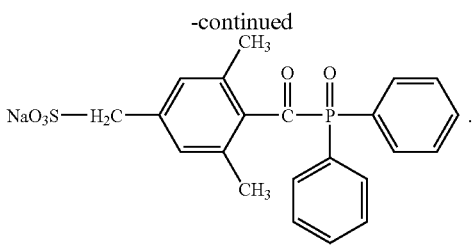
.
* * * * *